LIQUID CLARIFICATION SYSTEM
Filed Dec. 21, 1955 5 Sheets-Sheet 1
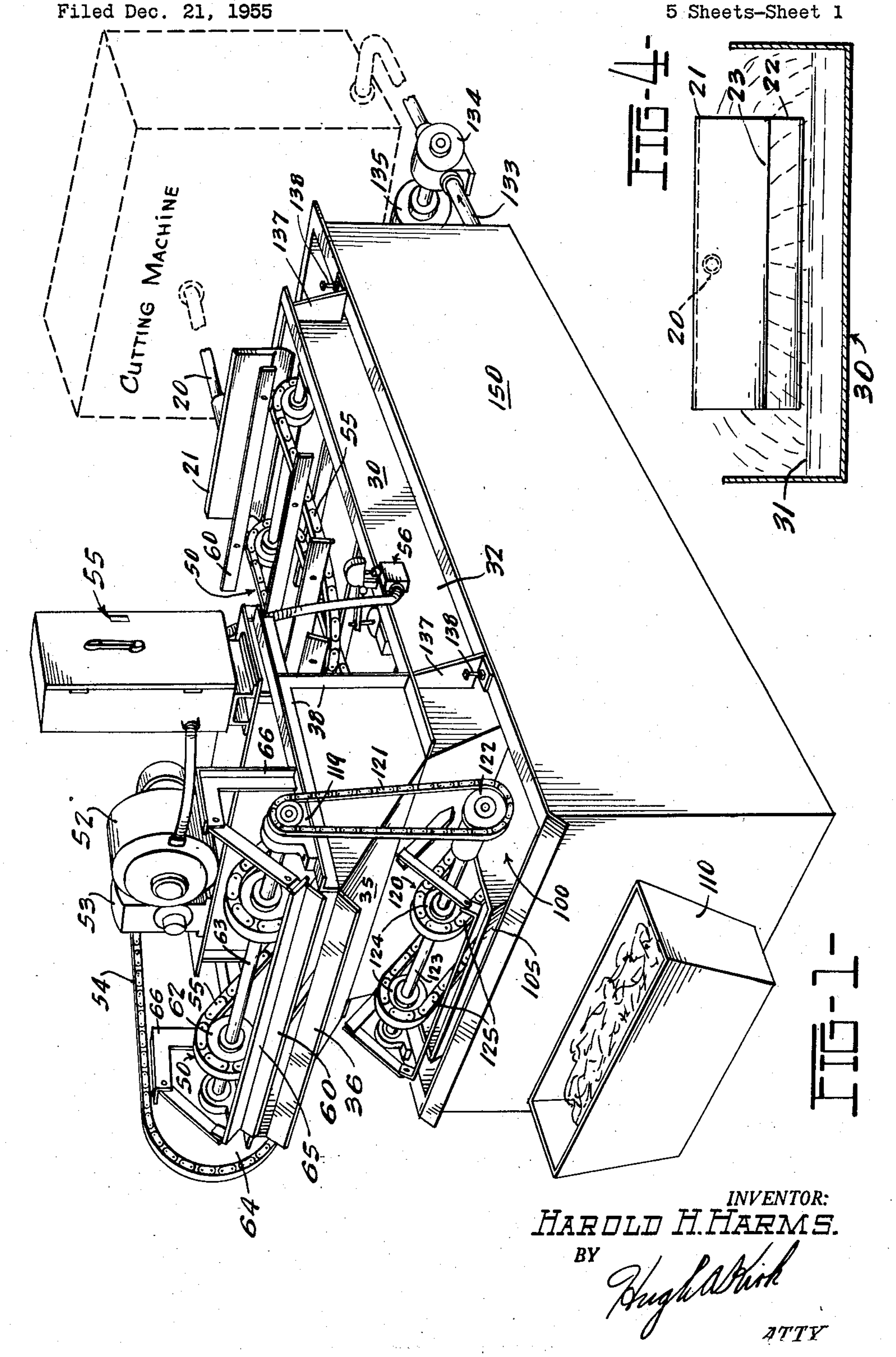
FIG-1-
FIG-4-
INVENTOR:
HAROLD H. HARMS.
BY Hugh A. Kirk
ATTY Nov. 25, 1958 H. H. HARMS 2,861,688
LIQUID CLARIFICATION SYSTEM
Filed Dec. 21, 1955 5 Sheets-Sheet 2
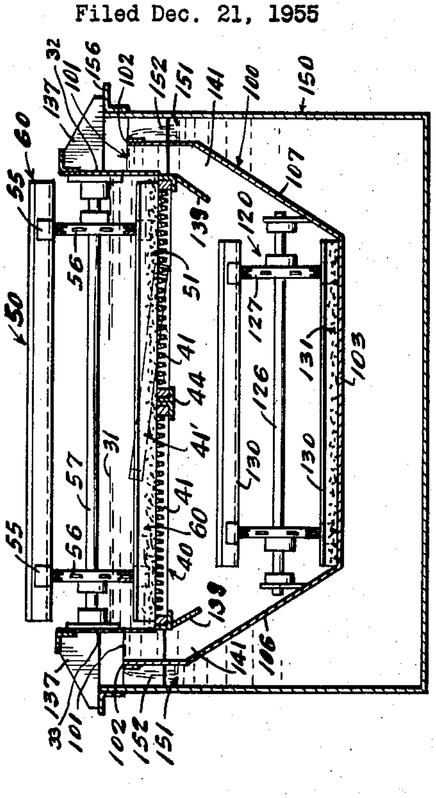
FIG-3-
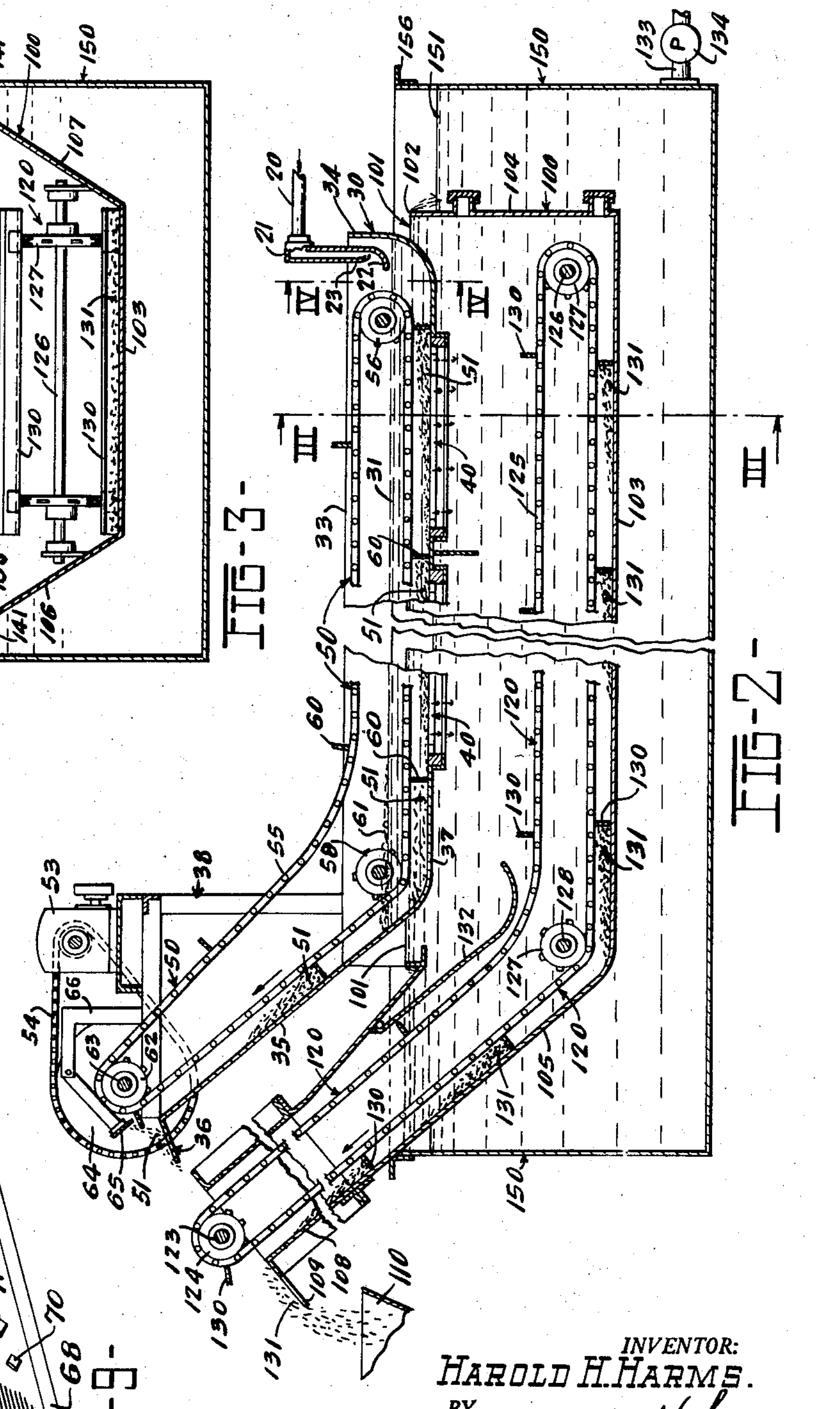
FIG-2-
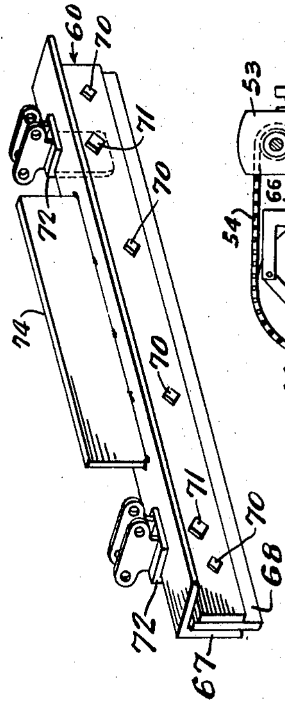
FIG-9-
INVENTOR:
HAROLD H. HARMS.
BY Hugh A. Kirk
ATTY.

Nov. 25, 1958 H. H. HARMS 2,861,688
LIQUID CLARIFICATION SYSTEM
Filed Dec. 21, 1955 5 Sheets-Sheet 3
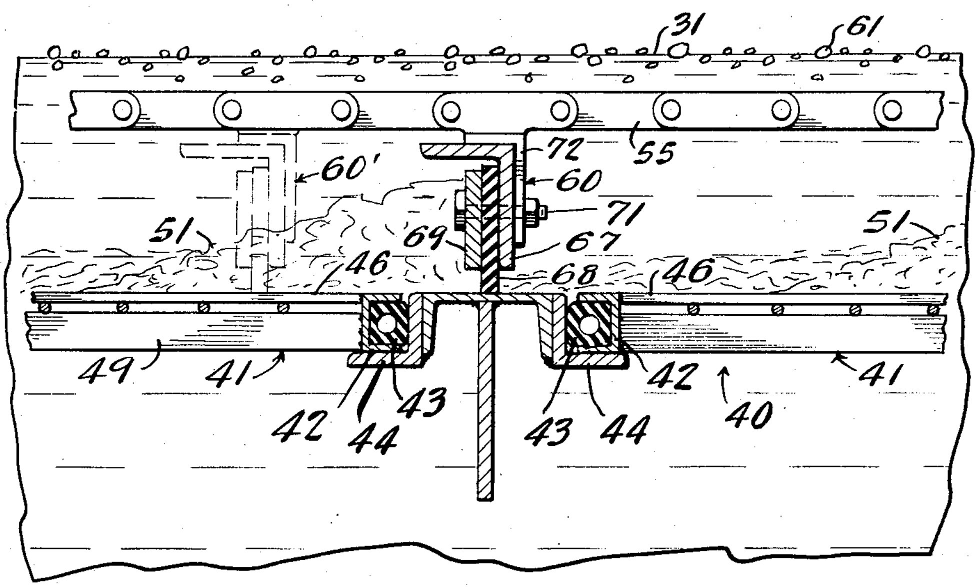
FIG-5-
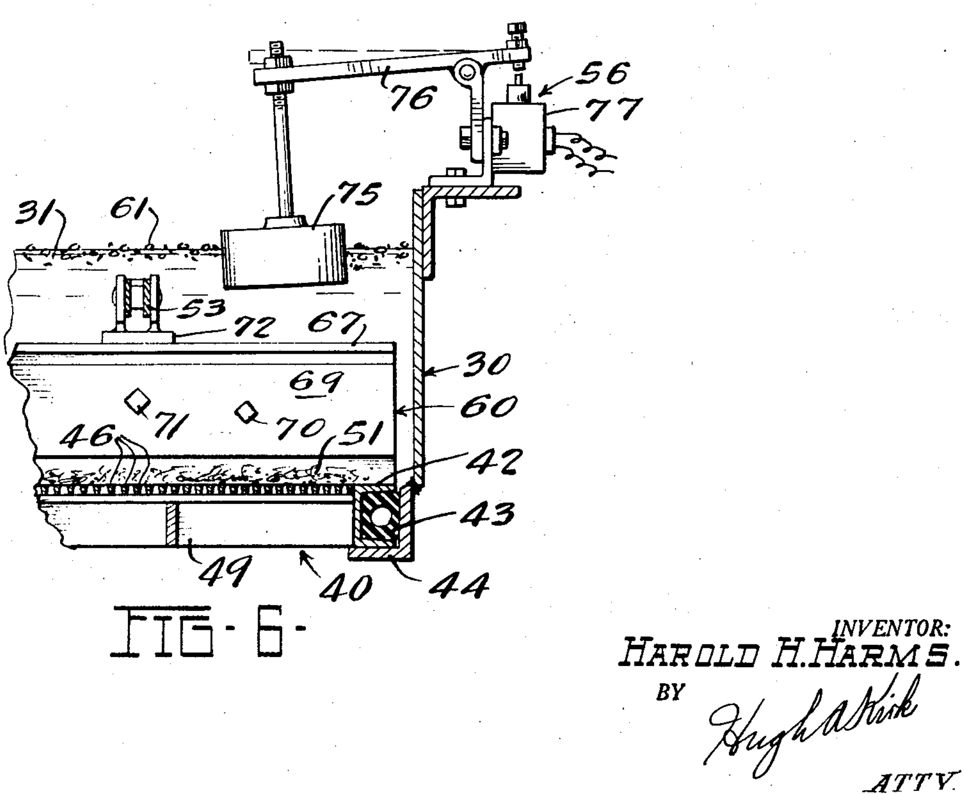
FIG-6-
INVENTOR:
HAROLD H. HARMS.
BY Hugh A. Kirk
ATTY.

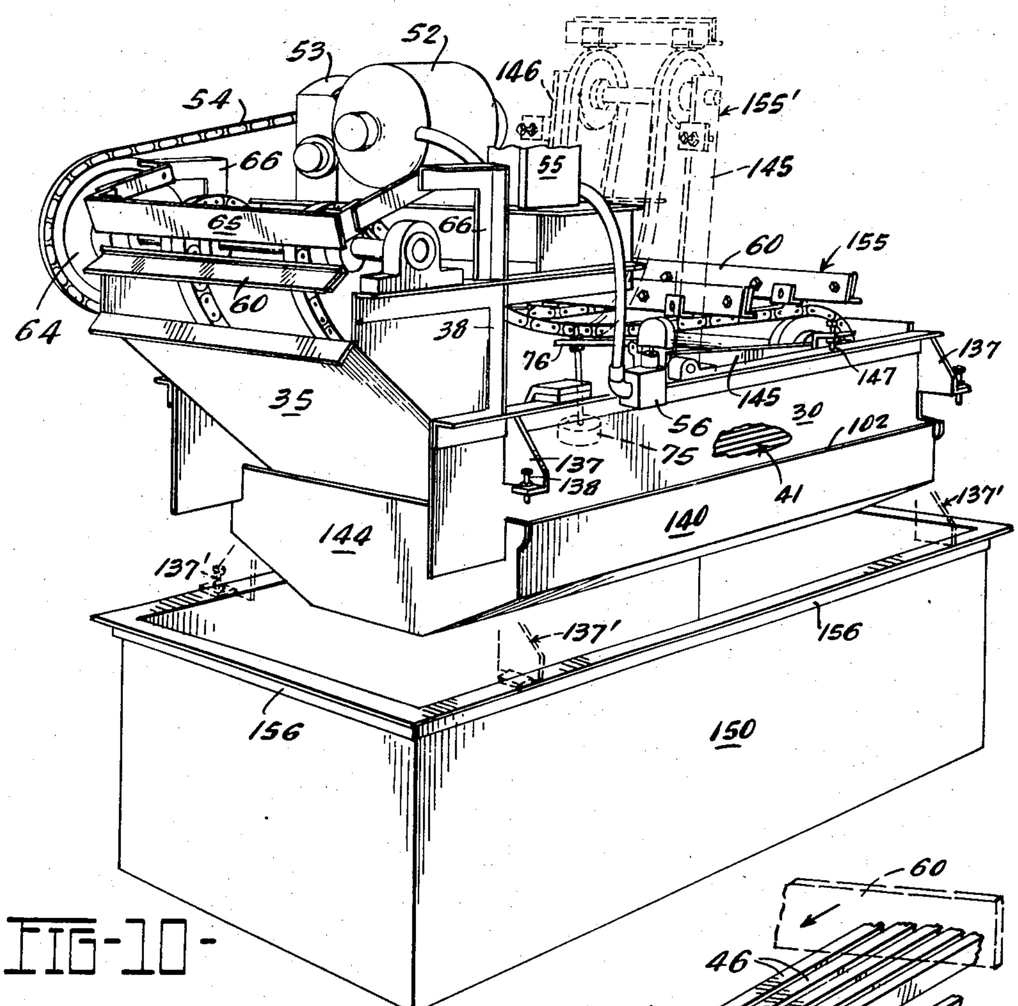
FIG-10-
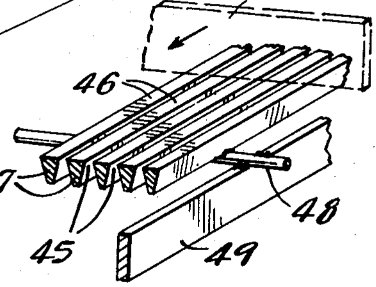
FIG-8-
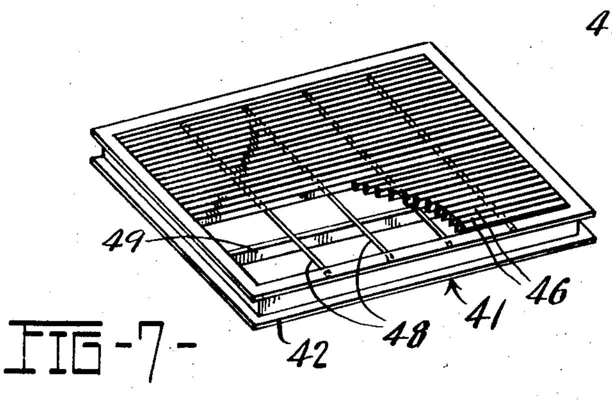
FIG-7-
INVENTOR:
HAROLD H. HARMS.
BY Hugh A Kirk
ATTY.

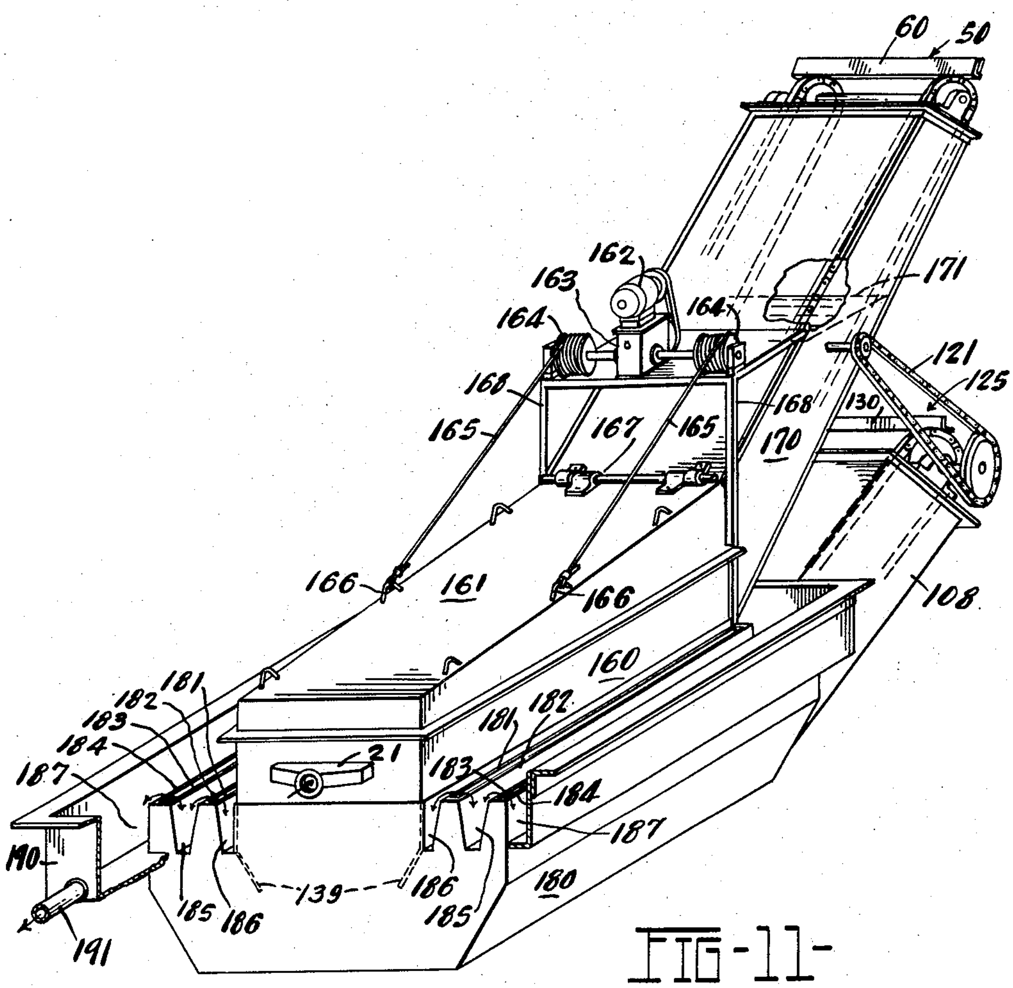
FIG-11-
INVENTOR:
HAROLD H. HARMS.
BY Hugh A Kirk
ATTY.

United States Patent Office 2,861,688

Patented Nov. 25, 1958

2,861,688

LIQUID CLARIFICATION SYSTEM

Harold H. Harms, Toledo, Ohio, assignor to Henry Manufacturing Co., Inc., Bowling Green, Ohio, a corporation of Ohio Application December 21, 1955, Serial No. 554,532

35 Claims. (Cl. 210—73)

This invention deals with liquid purification or clarification. More particularly, it deals with a method and apparatus for separating or removing solid particles dispersed or suspended in liquids, which particles may be heavier and/or lighter in density than the liquid which they contaminate. For example, this invention deals with a method and apparatus for separating the cuttings or swarf from cooling liquids or coolants so these liquids may be re-circulated through automatic cutting or grinding machines.

Previously, such apparatus comprised large settling tanks and/or filters which required much space and/or frequent cleaning which in turn required relatively long shutdown times.

It is an object of this invention to provide an efficient, effective, economical, continuous, rapid and simple method and apparatus for removing solid contaminating particles from liquids in which they are suspended or dispersed.

Another object is to produce such a separating apparatus which is comparatively small for the volume of liquid it can purify in a given period of time, and which does not require frequent shutdowns for cleaning, does not readily become clogged, and does not require a large settling reservoir.

Another object is to produce such a separating apparatus in which the contaminating particles of less density than the liquid or the flotsam are removed prior to the removal of the denser particles so as not to contaminate them to decrease their settling time and/or clog their filters.

Another object is to produce such an apparatus which automatically cleans itself as well as removes most of the liquid from the particles before they are discharged from the apparatus.

Another object is to produce such an apparatus which automatically controls the rate of flow of the liquids through it whereby a regular, uniform and high purification of the liquid is continuously maintained.

Another object is to produce such an apparatus in which the particles to be removed form their own filter bed, and no filtering aid or special filtering material to remove the particles is required.

Another object is to produce such an apparatus having a filter which does not become clogged and is automatically cleaned during the operation of the apparatus Another object is to produce such an apparatus which may be used for removing swarf from circulating coolants employed in grinding, turning, thread cutting or the like of metals, such as cast iron, steel and aluminum, carbon, and even plastics; for removing the particles from degreasing washer solutions, bonderizing solutions, and other special solutions including those in the food processing industry and breweries.

This invention is a continuation-in-part of the inventions disclosed in Harold H. Harms copending applications Serial No. 358,671 filed June 1, 1953, now abandoned, and Serial No. 474,644 filed December 13, 1954, now abandoned.

Generally speaking, the method or process of this invention for the separation of particles either liquids or solids from another liquid in which they are suspended or dispersed and not dissolved, comprises: (1) removing the lighter particles or flotsam from the liquid, (2) filtering the remaining lighter particle-free liquid through a filter bed formed by at least the larger of the heavier particles suspended in the liquid, and then (3) settling the resulting filtered liquid to remove the heavier finer particles from the liquid. It is the manner in which these three essential steps of applicant's process are carried out that is his invention.

The flotation separation of the lighter particles, such as for example, grease, soap, oil, etc., which contaminate coolants is performed by forming a first relatively shallow upper pool or reservoir of the liquid in which the flow of the contaminated liquid is sufficiently reduced so that the flotsam or lighter particles will rise to the surface, and by the entrance of the flowing liquid into one end of the pool, be driven to the other end thereof for accumulation and removal, although mechanical means also may be used to aid in the accumulation of the flotsam.

The filtering of the remaining contaminated liquid takes place at the bottom of the upper pool or reservoir by providing therein a screen, preferably non-clogging, for retaining at least the larger sized heavier particles suspended in the contaminated liquid, which will settle and rest on the screen and have built up on them other particles to form a filter bed through which the liquid must pass. A scraper or wiper type conveyor blade may be provided to sweep along the top of the screen at the bottom of this upper pool to prevent the filter bed from becoming too thick and reducing the rate of flow of the liquid through the apparatus. The conveyor may be driven by an electric motor, and preferably is provided with several flights or wipers, more than one of which is in contact with the screen at the same time, so that rapid cleaning of the screen is effected and only short intermittent operations of the conveyor are necessary as a result of which the filter bed of particles is substantially continuously maintained on the screen. This conveyor may be automatically controlled by a liquid level or float gauge on the upper pool. Thus, as the level of the liquid in this pool or its surface rises the conveyor motor is turned on to scrape a short distance, such as a fraction of an inch or more, so that more liquid will run through the narrow newly cleaned filter screen behind each wiper until the level of the pool is sufficiently lowered to shut off the motor and more of a bed is built up again on the screen to raise the liquid level again. The conveyor and/or scrapers or wipers are preferably arranged so that the screen may be easily removed or reached for cleaning, if such is ever necessary. The first or upper pool at its flotsam discharge end may be provided with a ramp trough up which the heavier solid particles from the screen may be moved by the wiper flights of the conveyor and on which particles the flotsam may accumulate and drain before being discharged comparatively dry into a receiver or tote box. If required, the first pool or reservoir may be covered to part way up the ramp trough at its end so that more of a liquid head may be provided for forcing a greater volume of contaminated liquid through the filter bed at its bottom.

The settling step is provided in a second or lower pool or reservoir into which the filter directly discharges filtered liquid containing those finer heavier solid particles which were not retained on the screen or in the filter bed. This second or lower pool is larger and deeper than the first or upper pool, so as to further decrease the linear rate of flow of liquid through it, and thus permit the smaller particles more time for settling. The discharge of the second pool is preferably over one or more of its edges or weirs or a plurality of edges or weirs formed there along to increase the volume of liquid flow per minute without increasing its linear rate of flow. These weir edges maintain the liquid level of the second pool fixed. It is an important feature of this invention that the liquid level of the second pool be above the filter bed in the bottom of the first pool and below the liquid level of the first pool, so that the flotsam will never contact the filter bed in the first pool to contaminate or clog it. Around the edge weirs of the second pool may be provided a collecting trough for the clarified liquid for directing it for recirculation or storage, as desired. The second pool may also be provided with a conveyor scraper for its bottom for continuously removing the settlings therefrom, which conveyor may be run simultaneously with that of the filter scraper conveyor for the first pool and discharge its swarf into the same collector or tote box as that of the first pool by raising it up a ramp at an end of the second pool for drainage before its discharge. In fact, the ramp for the second pool conveyor may be longer than that for the first so that the first conveyor is discharged into the second for further drainage before being dumped into a tote box.

The above mentioned and other features and objects of this invention and the manner of attaining them will become more apparent and the invention itself will be best understood by reference to the following description of embodiments of the invention taken in conjunction with the accompanying drawings, wherein:

Fig. 1 is a perspective view of one embodiment of the liquid clarification apparatus of this invention showing conveyors for removing swarf from both the upper or filter containing reservoir and the lower second or settling reservoir;

Fig. 2 is a longitudinal vertical section with parts broken away of an apparatus similar to that shown in Fig. 1, but with the second or settling reservoir conveyor shown to extend beyond the discharge of the filter cleaning conveyor;

Fig. 3 is a vertical section taken along lines III—III of Fig. 2;

Fig. 4 is an end view of the contaminated liquid inlet distributor device taken along line IV—IV of Fig. 2 as it discharges into one end of the upper or filtering reservoir;

Fig. 5 is an enlarged vertical sectional view of a part of the filter screen of Fig. 2 including its support and one of its wipers, and showing in dotted lines the usual distance the flight is moved each time the conveyor is operated, together with the swarf accumulated on the filter screen and in front of the wiper;

Fig. 6 is an enlarged vertical sectional view through one side of the upper reservoir of Fig. 2 showing one end of a wiper and the screen, together with a level float gauge used for automatically maintaining the level of the liquid in the upper or first reservoir;

Fig. 7 is a perspective view of one embodiment of the filter screen unit with a part broken away, which may be employed in the apparatus of this invention;

Fig. 8 is an enlarged perspective view of one portion of the screen of Fig. 7, showing the non-clogging slots therein and their supports;

Fig. 9 is a perspective view of a modified conveyor flight similar to that shown in Fig. 5 for the screen wiper, including a flotsam pusher baffle mounted above the wiper;

Fig. 10 is a perspective view of another embodiment of a smaller type of apparatus according to this invention without the lower reservoir cleaning conveyor, but with a pivoted filter cleaning conveyor (which is shown in dotted lines in its raised position for removing and/or cleaning the filter screens in the bottom of the upper reservoir) and a tank on and in which the first and second reservoirs and their apparatus may rest (as shown by the apparatus supporting legs in their dotted line position); and Fig. 11 is a perspective view with parts broken away of a further embodiment of this invention in which the upper reservoir and trough is covered to increase the liquid head on the filter in the first reservoir, and a plurality of parallel overflow weir edges on the second reservoir to increase the volume but not the linear rate flow of the liquid through the apparatus.

Referring primarily to Figs. 1 to 3 of the accompanying drawings, there is shown an embodiment of the liquid clarifier of this invention through which a liquid to be clarified may be circulated. The liquid is introduced into the apparatus through an inlet pipe or duct 20 from whence it is distributed along the surface of a first or upper pool or reservoir 30, the bottom of which reservoir is provided with a filtering screen 40 the top of which is intermittently wiped by the flights 60 of a conveyor 50 which also pushes the swarf 51 collected on the top of the screen up an inclined trough or ramp extension 35 on the tank 30 above the surface 31 of the liquid in the reservoir 30 for draining before it is discharged over the lip 36 at the upper end of the trough. On a frame 38 at the ramp end of the reservoir 30 may be mounted an electric motor 52 driving a reduction gear device 53 and belt or sprocket chain 54 to drive the conveyor 50, which motor 52 may be controlled through an electric control switch box 55 and a liquid level float controlled switch mechanism or device 56 which may be mounted on the edge of the upper reservoir 30 (see also Fig. 6).

Below the first or upper flotation reservoir 30 there is mounted a second and deeper settling pool or reservoir 100 (see Figs. 2 and 3) into the top of which the bottom of reservoir 30 rests, so that the level of the screen 40 and the filter bed of swarf 51 collected thereon is always below the liquid level 101 of the clarified liquid in the tank 100. If desired, the second reservoir 100 may also be provided with an inclined ramp end 105 and a second conveyor 120 which scrapes the settlings 131 from the bottom of the reservoir 100 and up the ramp trough 105 for discharge with the swarf 51 into a container or tote box 110 which may be replaced when it is filled by the attendant of the apparatus. The discharge of the settling reservoir 100 is over one or more of its weir type edges 102 which may extend along both sides and even the ends of the tank 100 to further reduce the linear rate of the flow of the liquid through the reservoir 100 without reducing its volume of flow. In the embodiment shown in Figs. 1 to 3 the second reservoir 100 is supported inside a third reservoir or tank 150 still larger than the reservoir 100 and into which the clarified liquid overflows from the weir edges 102 and in which tank it is stored before being discharged or recirculated through a duct 133 near the bottom of the tank, which may be connected to a circulating pump 134 driven by a separate motor 135.

Now that the general flow of the liquid to be clarified has been traced through one embodiment of the apparatus, a more detailed description will be given of the parts of the apparatus in the following three sections or chapters for each of the three major successive treating steps of the system of this invention: namely, I. Flotation, II. Filtration and III. Settling.

I. FLOTATION

The liquid to be clarified which enters the duct 20 may be distributed by means of a downwardly open end U-shaped channel member 21 (see Figs. 2 and 4) mounted at the end of the duct 20, one side 22 of which trough 21 extends beyond and is bent under the other and shorter side 23, which may be bent inwardly to form a narrower slit opening to distribute the liquid uniformly over the surface along substantially the full end of the first pool or liquid reservoir 30 of the apparatus. This surface level 31 may be maintained just below the lower edge 22 of the liquid distributor inlet so that the liquid in reservoir 30 is relatively shallow in depth. The reservoir 30 may have vertical sidewalls 32 and 33 and one end wall 34, and an upwardly sloping ramp or trough 35 at its other end which projects sufficiently above the surface 31 of the liquid in the first pool to act as a drainboard for the swarf pushed up it by the conveyor 50 before being discharged over its upper edge 36.

The velocity of the incoming liquid from the distributor 21 at inlet end of the tank 30 urges the floating or less dense particles suspended in the liquid toward the other end and ramp 35 where the flotsam 61 accumulates on the surface of the liquid in a shallow region where the linear flow rate of liquid is much decreased to permit the rapid rise of the less dense particles. This flotsam swarf is then removed by the rising flights of the conveyor 50 loaded with the heavier swarf 51 to which the flotsam may adhere.

II. FILTRATION

At least in that part of the bottom of the reservoir 30 near its inlet, there is provided a filter screen 40 upon which a filter bed of at least the larger particles 51 in the liquid accumulate. This screen 40 may be made in separate units or sections 41 (see Figs. 5 through 8, specifically Fig. 7) which sections may be mounted in frames 42 provided with rubber tubular gaskets 43 (see Figs. 5 and 6) to insure a liquid tight fit in their supporting frame ledges 44 extending across the bottom and around the edges of the tank 30 in which the screen frames 41 are removably set. The removal of the screen sections 41 is more clearly shown in Fig. 3 in which one screen 41′ (shown in dotted lines) is partially removed from its supporting ledges 44. The screen sections 41 preferably are made of such a size relative to the spacing of the flights that when the flights 60 are in the position shown in Fig. 5 over cross supporting members 44, the screens may be removed without demounting the conveyor. If more flights on the conveyor are employed than the distance between each screen section, they may be so arranged with respect to the size of the screen sections, that only one intermediate flight need be removed for replacing the screen sections. The upper surface of these screens are flush with the upper surface of the bottom 37 of the tank 30 so that they may be evenly wiped by the flights of the conveyor 50. These screens also must have very fine openings or slots 45 (see Fig. 8) which are preferably tapered outwardly therefrom to prevent them from becoming clogged, and may be formed and produced similar to the screen disclosed in Johnson Patent No. 2,129,428 issued September 6, 1938. After the screens are assembled they may be ground flat on their upper surface 46 to produce the sharp edged non-clogging slits 45. The parallel bars 47 of the truncated triangular or triangular cross section between and forming the slots 45 may be welded to cross rods 48 which in turn may be welded to crossbars 49 at right angles thereto for reinforcement and mounting in the frames 41 and to prevent deformation of the upper ground surface 46 of the top of the screen sections 41.

The conveyor 50 mounted in the tank 30 may be driven by a pair of parallel sprocket chains 55 (see Figs. 2 and 3) which extend around: a pair of sprocket wheels 56 which may be mounted or journalled on a shaft 57 mounted at the inlet end of the tank 30 between the sides 32 and 33, a similar pair of idler sprockets 58 at the other or ramp end 35 of the tank 30 to guide the flights 60 on the conveyor to wipe the upper surface 49 of the screens 40 and the bottom 37 of the tank 30, and a third and driving pair of sprockets 62 which may be mounted on the frame 38 for the motor 52 and driving mechanism for this conveyor described above. These driving sprockets 62 may be mounted on a shaft 63 which is driven through a larger driving sprocket wheel 64 by chain 54 from the reduction gear device 53. Thus, as the conveyor is driven the flights 60 thereof scrape evenly over the surfaces 49 and 37 at the bottom of the reservoir and up the ramp 35 to move the swarf 51 and floating material 61 up the ramp 35 for draining and then discharge it over the lip 36, at which place each of the flights 60 may be cleaned by a scraper 65 pivotly mounted on brackets 66 attached to the frame 38.

Referring now to the structure of the conveyor flight 60 itself shown in Figs. 5, 6 and 9, it may comprise a cross angle bracket 67 to which is bolted a hard rubber wiper strip 68 between one side of the angle bracket 67 and a plate or bar 69, by means of bolts 70, all of which assembly of the angle bracket 67, wiper 68 and bar 69 may be bolted as a unit by means of bolts 71 to the pusher members 72 integral with the links of the chain 55. If desired, one or more of the angle brackets 67 may also be provided with an upwardly projecting plate or fin 74 as shown in Fig. 9 which may be employed for pushing the flotsam or floating material 61 toward the ramp end of the tank 30.

The control of the level 31 of liquid in tank 30 may be accomplished by a float controlled device 56 shown in detail in Fig. 6 which may comprise a float 75 which rests in the surface 31 of the liquid and is connected to a pivoted lever arm 76 for controlling a contact switch 77 mounted on a side of the tank 30, which switch in turn controls the "off" and "on" energization of the motor 52 for driving the conveyor 50. Thus, for example, in normal operation the motor may be energized only for a second or two every minute or so depending upon the type of material being filtered and how long it takes to build up the filter bed of swarf 51 on the screen 40, and how soon it becomes clogged so the surface level 31 in the tank 30 rises to operate the switch 77. Thus, as soon as the level falls by the opening of the screen 40 and removal of the bed formed thereon sufficiently for liquid to flow through the clean strip of screen behind each wiper 60, the motor 52 is stopped. Accordingly, very little power is consumed by the apparatus and the conveyor 50 and its flights 60 are most of the time stationary and not moved at all, and when they are moved they are only moved a sufficient distance (see from 60 to 60′ in Fig. 5) to maintain the liquid level 31 in a given position to insure a constant flow rate and uniform separating rate of the liquid as it passes through the apparatus. Because of the periodic motion of the conveyor 50, the swarf carried up the ramp 35 has sufficient time to drain before it is discharged over the lip 36.

III. SETTLING

Supported by and extending below the outer rim of the first or upper chamber or reservoir 30 is the second, lower or settling chamber or reservoir 100 for the liquid which has passed through the filter 40. This second or settling reservoir 100 is deeper and slightly larger than the reservoir 30, having in Figs. 1–3 a flat bottom 103, tapering sides 106 and 107, vertical end 104 corresponding to the vertical end 34 of chamber 30, and a sloping ramp 105 at its other end which may have a trough extension 108 (Fig. 2) that extends at a greater height than the discharge lip 36 on the ramp 35 of the prior separating chamber 30. For this bottom 103, ramp 105 and trough extension 108 there is provided a second conveyor 120 which may be driven from the drive shaft 63 of the conveyor 50 (see Fig. 1) through a sprocket wheel 119 and a belt or chain 121 to a sprocket 122 on the driving shaft 123. The discharge of swarf material from lip 36 thus may fall upon the ramp 105 and/or its extension 108 to be carried up for discharge over a lip 109 at the upper end of the extension 108 by the conveyor 120 before being discharged into tote box 110. Upon this shaft 123 are mounted a pair of sprocket wheels 124 for driving a pair of sprocket chains 125 of the conveyor 120 which extend down along the extension 108, ramp 105 and bottom 103 of the tank 100, substantially parallel to the conveyor 50. Along the bottom 103 of the tank 100 there may be provided two or more shafts 126 and 128, each of which carries a pair of idler sprockets 127 and 128, respectively, for guiding the chains 125 horizontally along the bottom 103 to the bottom of the ramp 105, so that the flights 130 anchored between the adjacent chains 125 at regular intervals will scrape the fines and settled swarf materials 131 before them across the bottom 103 and up the ramp 105 for discharge into the tote bucket or box 110 together with the heavier and floating swarf 51 and 61 deposited or dropped into the ramp 105 and/or extension 108 from the lip 36 by the upper reservoir conveyor 50. If desired, a conveyor chain guide or bracket 132 may be provided for the upper flight of each of the chains 125 in the reservoir 100 at the bottom of ramp 105 to keep the chains 125 from rubbing against the bottom 37 of the upper reservoir 30. Also, if desired, a scraper (not shown) but similar to scraper 65 for the flights 60 of the conveyor 50, may be provided at the top end of the extension 108 for the flights 130 of the conveyor 125.

The deeper and larger settling reservoir 100 further slows down the particle linear rate of flow in the liquid passing through the apparatus, and permits the fines which may have passed through the filter bed of swarf 51 and screen 40 a sufficient time to settle at the bottom 103 of the tank 100 and be removed therefrom by the conveyor 125. However, the volume of liquid per unit time passing through the tank 100 remains the same as that for tank 30, because the overflow from the tank 100 comprises a long weir 102 along both the top sides and end edges of the tank 100. As shown in Fig. 3 this weir 102 may form a vertical partition between the sides of an outer trough or third and still larger tank 150 and upper tank 30, which partition may be centered and spaced from the inside of tank 150 and outside of tank 30 by means of projecting guide flanges 152 attached to and between the walls of the tanks 30 and 100. This larger tank 150 thus receives the clarified liquid which may be maintained at a level 151 below the edge 102 of the weir by means of the discharge or circulating pump 134 at the outlet 133 near the bottom of the large tank 150. Around the top edge of the tank 150 there may be placed a reinforcing angle member 156 upon which flanges 137 anchored to the upper tank 130 may rest to support the tanks 30 and 100 and their apparatus. In order to maintain the weir 102 strictly horizontal for even flow over its full length, level adjusting bolts 138 are provided on each of the supporting flanges 137, between them and the rim 156 of tank 150.

The liquid levels 31, 101 and 151 are respectively vertically below each other, so there is a definite gravity flow of liquid through the apparatus, and the difference in liquid levels 31 and 101 is automatically maintained by means of the level controlling device 56 described above. Usually the amount of swarf which goes through the filter 40 is comparatively small in that the screens are accurately made to hold back most of the particles. Along the bottom edges of the upper reservoir or tank 30 there preferably are provided baffles 139 (see Fig. 3) to prevent the liquid after it has been filtered from being directly sucked up over the weir 102 through channel 141 before any fines suspended therein have had time to settle.

*Modifications*

Referring now to the embodiment shown in Fig. 10 a smaller device than that shown in Figs. 1 to 3 is disclosed in which the lower or second conveyor 125 and sloping outer end of the settling tank is not employed. The tanks or reservoirs 30 and 140 (corresponding to tank 100) are shown in Fig. 10 elevated out of their supporting tank 150, with only the legs 137 on tank 30 shown in dotted normal position 137′ on the edge of tank 150 so that the shape of settling tank 140 may be seen, with both of its ends 144 vertical. Since there is no continuous cleaning of the sediment from the bottom tank 140, the conveyor 155 (corresponding to conveyor 50) in the tank 30 is shown to be mounted on a pair of pivoted arms 145 and 146 so that it may be raised vertically as shown in dotted line position 155′ so that the screens 41 in the bottom of the tank 30 may be readily removed, and access to the bottom of the tank 140 may be reached for cleaning. Since most of the swarf is removed in the tank 30 it is not necessary that the tank 140 be cleaned very often, and particularly for comparatively small apparatus where the volume of liquid circulation is not large. There is also provided an adjusting means 147 comprising supporting brackets and locking bolts at the outer ends of arms 145 and 146 for adjusting the limiting downward contact of the conveyor 155 and its wipers 60 with the surface of the bottom of the tank 30, namely the surface 46 of the screens 41.

Still another embodiment of the apparatus of this invention is shown in Fig. 11, in which the upper or filtering reservoir 160 (corresponding to reservoir 30) is provided with a removable cover or lid 161 which may be hoisted when desired by an additional motor 162 through reduction gear 163 operating a pair of windlasses 164 having cables 165 which extend to loops 166 along the top of the lid 161 which may be hinged at its end 167. The motor 162 and windlasses 164 may be mounted on a platform or frame 168 above the tank 160 similar to the frame 38 shown in previous embodiments. There is also provided a longer and enclosed ramp extension 170 from the bottom of the tank 160 so that the liquid level 171 in the tank 160 may stand up into the neck or ramp extension 170 to provide a greater liquid head for pushing the liquid through the filter and filter bed at bottom of tank 160. The lid 161, accordingly, has a liquid tight seal with the top of the tank 160 as has also the extension 170. In order to cope with the increased flow of liquid through this apparatus by the pressure head 171, the overflow edges of the second or lower and settling tank 180 (corresponding to tank 100 or 140) are shown provided with a plurality of parallel weir edges 181, 182, 183 and 184, thus permitting a much greater flow volume without increasing the linear rate of flow of liquid through the apparatus. This longer weir 181—184, however, may directly discharge liquid into a plurality of troughs 185, 186 and 187, which may be connected at their ends in manifold type trough 190, part of which is broken away in Fig. 11 to see the ends of the other troughs 185, 186 and 187. From the bottom of the manifold type trough 190 there may extend the outlet duct 191 for the clarified liquid.

Thus it can be seen that the rate of flow of the liquid through the apparatus of this invention may be accurately controlled and that its volume capacity may be adapted by changing the length and width of the tanks, screens, and weirs as desired without departing from the scope of this invention. Thus, any one or more of the different features shown in the above different embodiments may be interchanged or combined to meet a wide variety of needs.

Also, if desired, the liquid may be heated or chilled by coils inserted in one or more of the reservoirs of the apparatus to aid in the operation of the device depending upon the particular liquid to be clarified.

For example, an apparatus according to this invention was operated for two months of industrial service on a soluble oil coolant having specific gravity of .9989 and a viscosity at 100° F. of 28.46 Saybolt seconds. Before the treatment through this apparatus, this coolant carried 114 parts of suspended particles per million and after treatment hereunder the suspended parts were decreased to 6 per million. Such particles ranged up to 3 mm. in length and 0.3 mm. in diameter. The width of the slots 45 in the screens 41 was about 0.1 mm. The swarf discharged into the tote box 110 contained about 66.4% solid particles which ranged down to micron sizes and comprised from 3 to 15% ceramic materials from the grinding tools, 83 to 96% acid soluble matter, and .2 to 2% volatile matter. The size of particles up to 10 microns was under 5% of the swarf, and particles over 50 microns in size was 61%, with about 34% having particle sizes between 10 and 50 microns. The apparatus of this invention has proven to be between 91 and 99% efficient for various liquids to be clarified.

The size of the apparatus of this invention may vary from the smallest model of about 2 feet wide, 5 feet long and 1½ feet high through a model about 3½ feet wide, 9 feet long and 2 feet high to even larger as required, with flow capacities from 10 to 100 gallons per minute, or more. These measurements do not include the length of the extensions of the ramps at the ends of the tanks, but only relate to the combination of the two or three reservoirs or tanks themselves for the liquid providing the liquid levels 31, 101 and 151 respectively.

While there is described above the principles of this invention in connection with specific apparatus, it is to be clearly understood that this description is made only by way of example and not as a limitation to the scope of this invention.

What is claimed is:

1. A liquid clarification system comprising a larger liquid chamber having a given liquid level, a smaller liquid chamber in said first chamber, said smaller chamber having a liquid level above said given liquid level of said larger chamber, a filter in the bottom of said smaller chamber submerged below said given liquid level of said larger chamber, means for flowing the liquid to be clarified from the top of said smaller chamber through said filter and from the top of said larger chamber, and means for maintaining the liquid level in said smaller chamber within a predetermined distance above said given liquid level in said larger chamber.

2. A system according to claim 1 wherein said means for maintaining the distance between said liquid levels includes a float means responsive to the liquid level in said smaller liquid chamber.

3. A system according to claim 1 wherein said filter comprises a screen having parallel slots, said slots being wider at their bottom than at their top.

4. A system according to claim 3 including means for wiping the top of said slots.

5. A system according to claim 4 including a float means responsive to the liquid level in said smaller chamber and means operated by said float means for moving said wiper means.

6. A system according to claim 1 including means for collecting the liquid from the top of said larger chamber.

7. A system according to claim 1 including means to skim the liquid level in said smaller chamber.

8. A system according to claim 7 wherein said skimming means also acts to wipe said filter.

9. A particle-liquid separator for separating both lighter and heavier particles than the liquid from said liquid in which they are suspended, comprising: a first liquid chamber permitting the flotation of said lighter particles, a filter in the bottom of said first chamber upon which said larger heavier particles accumulate and form their own filter bed, means to remove both said lighter and said heavier particles from the surface and bottom of said first chamber, liquid level responsive means in said first chamber for controlling the operation of said particle removing means, a second liquid chamber below said first chamber for settling the smaller heavier particles which pass said filter, an overflow edge from said second chamber establishing a second liquid level above that of said filter in the bottom of the first chamber but below the liquid level of the liquid in said first chamber, whereby said lighter particles cannot clog the filter because said filter is always completely submerged in liquid, and means for collecting the overflow from said edge of said second chamber.

10. A separator according to claim 9 wherein said filter comprises a screen and said means to remove the particles from the bottom of said first chamber comprises a wiper for intermittently wiping successive sections of said screen.

11. A separator according to claim 9 wherein said screen is a non-clogging screen.

12. A separator according to claim 9 wherein said liquid level responsive means comprises a float, a switch operated by said float and an electric motor controlled by said switch for operating said means for removing said particles.

13. A separator according to claim 9 wherein said second liquid chamber is larger than said first liquid chamber and has a much slower rate of flow for a given amount of liquid passing therethrough.

14. A separator according to claim 9 wherein said overflow edge comprises a weir along at least one side of said second chamber.

15. A separator according to claim 9 wherein said means for collecting the overflow comprises a trough.

16. A separator according to claim 9 wherein said means for collecting the overflow comprises a third chamber, and means for supporting said first and second chambers in said third chamber so that the first chamber is above the second and the second is above the third and their liquid levels are also correspondingly vertically separated from each other.

17. A separator according to claim 9 wherein said means to remove the particles from the first chamber comprises a conveyor having flights which wipe against said filter.

18. A separator according to claim 9 including additional means for removing the particles settled to the bottom of said second chamber.

19. A separator according to claim 18 including means for operating said first removing means together with said sediment removing means for said second chamber.

20. A separator according to claim 18 including means for draining the particles removed from said chambers before they are discharged whereby the liquid drained therefrom comes back into the corresponding chambers from which they were removed.

21. A separator according to claim 9 including means to circulate the liquid through the apparatus from the overflow from said second chamber back into said first chamber.

22. A separator according to claim 9 including a cover over said first chamber to increase the liquid head on the filter in the bottom of said first chamber.

23. A separator according to claim 9 including means for adjusting the relative levels between the surfaces of the liquid in said chambers.

24. A solid-liquid separator for separating both lighter and heavier solids than the liquid from said liquid in which they are suspended, comprising: a first liquid chamber permitting the flotation of said lighter particles, a screen filter in the bottom of said first chamber upon which at least most of the larger of said heavier particles accumulate to form their own filter beds, a wiper conveyor movable over said screen to remove said particles as they accumulate, a liquid level responsive means in said first chamber for controlling the operation of said wiper conveyor to intermittently remove the portions of said filter bed to maintain a given fluid flow through said bed and filter screen, a second liquid chamber below said first chamber for settling the smaller heavier particles which pass through said filter screen, said second liquid chamber having a weir overflow establishing a liquid level therein above that of said filter and below that of the liquid level in said first chamber whereby said lighter particles do not clog said filter, a third chamber for collecting the overflow from said weir, means to remove the heavier particles settled in said second chamber, ramp means at the end of said first and second chambers to drain the liquid from the particles removed from their respective chambers, and means for circulating the solid-particle contaminated liquid through said apparatus from said first to said third chamber.

25. A liquid purification apparatus comprising: a first reservoir means for separating floating materials from said liquid, means for removing the resulting separated floating materials, screening means at bottom of said first reservoir means on which the sinking materials form a filter coating, means to remove said coating materials from said screening means as they accumulate to maintain at least a given rate of flow through said filter, a second reservoir means below said screening means for settling the sinking materials which pass said screening means, and means for maintaining the level of said liquid in said second reservoir means above said screening means and below the level of said liquid in said first reservoir means whereby said floating materials are prevented from contaminating said screening means.

26. An apparatus according to claim 25 wherein said screening means comprises a non-clogging screen.

27. An apparatus according to claim 25 wherein said means to remove said coating materials from said screening means comprises a wiper connected to a conveyor, and means for intermittently operating said conveyor controlled by said means for maintaining the levels of said liquids.

28. An apparatus according to claim 25 including means to remove the sinking material from said second reservoir means.

29. An apparatus according to claim 25 including means to drain the materials removed by said material removing means.

30. A method of purifying a liquid contaminated with suspended particles both heavier and lighter than said liquid, comprising: forming at least two pools of said liquid having vertically spaced surface levels, circulating said liquids successively through said pools from the one with the upper level to that with the lower level, distributing said contaminated liquid along one side of the surface of the upper pool to reduce the flow rate of said particles and permit their gravity separation, accumulating the gravity separated lighter particles at the surface of said upper pool along its opposite side, forming a filter bed of at least the larger of said heavier particles at the bottom of said upper pool between said upper and the next lower pools, said filter bed being below the surface level of said next lower pool whereby said filter bed is always submerged in said liquid, filtering part of said heavier particles out of said liquid by said filter bed, automatically and intermittently removing said accumulated lighter and filtered heavier particles from said upper pool whereby the flow of said liquids between said pools and the vertical distance between their said surface levels is maintained at a predetermined value, further reducing the particle flow rate in said liquid in said next lower pool whereby the smaller of said heavier particles settle to the bottom of said next lower pool, and decanting the resulting purified liquid from the surface of said next lower pool.

31. A method according to claim 30 including accumulating the resulting removed liquid and recirculating it for further contamination and clarification.

32. A method according to claim 30 including draining the liquid from all the particles removed from said pools back into the corresponding pool from which said particles were removed.

33. A method according to claim 30 including removing the particles settled out in said next lower pool.

34. A particle liquid separator for separating both lighter and heavier particles than the liquid from said liquid in which they are suspended, comprising: a first liquid chamber permitting flotation of said lighter particles and settling of said heavier particles, a first ramp means extending from a side of said first liquid chamber, a first conveyor means to remove settled particles from the bottom of said first chamber up said first ramp means, a skimming means to remove said lighter particles from the top of the liquid in said first liquid chamber, a second liquid chamber adjacent said first liquid chamber and having at least one wall in common between the liquids in both chambers and receiving liquid from said first liquid chamber for permitting further settling of heavier particles from said liquid, a second ramp means from a side of said second liquid chamber, a second conveyor means to remove settled particles from the bottom of said second liquid chamber up said second ramp means, and an overflow edge on one of said liquid chambers for the liquid passing from that chamber.

35. A separator according to claim 34 wherein said overflow edge comprises a plurality of parallel weir edges.

References Cited in the file of this patent

UNITED STATES PATENTS

| | | |
|---|---|---|
| 669,335 | Behrend | Mar. 5, 1901 |
| 2,469,197 | Hermann | May 3, 1949 |